Jan. 18, 1938.　　　　　G. CHALLIS　　　　　2,105,805
ROW CROP MULCHER
Filed May 7, 1937
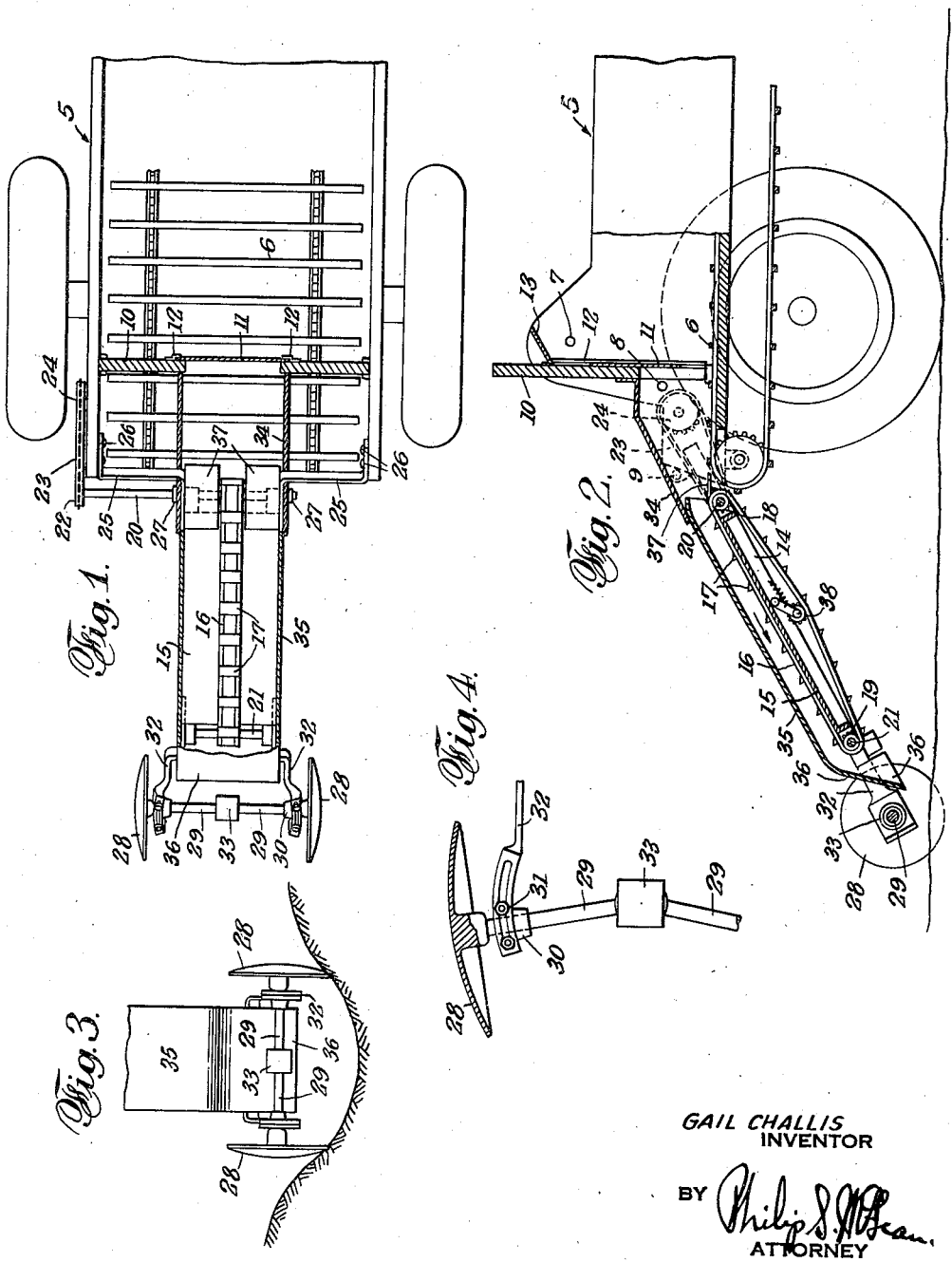
GAIL CHALLIS
INVENTOR
BY
ATTORNEY Patented Jan. 18, 1938

2,105,805

UNITED STATES PATENT OFFICE 2,105,805

ROW CROP MULCHER

Gail Challis, Russell Springs, Kans., assignor of one-half to T. T. Logan, Russell Springs, Kans.

Application May 7, 1937, Serial No. 141,262

3 Claims. (Cl. 47—9)

The invention herein disclosed is a row crop mulcher for mulching the bottoms of lister furrows, leaving the ridges bare for cultivation.

Objects of the invention are to provide a machine for mulching the bottoms of lister furrows, which may be readily attached to and operated from a straw or manure spreader, which will be of simple and sturdy construction, relatively inexpensive and adapted to effectively accomplish the desired mulching operations.

The foregoing and other desirable objects are attained in this invention by novel features of construction, combinations and relations of parts as hereinafter disclosed and broadly claimed.

The drawing accompanying and forming part of the specification illustrates one of the practical commercial embodiments of the invention, but it should be understood that the structure may be modified and changed in various ways all within the true intent and broad scope of the invention.

Fig. 1 is a broken part sectional and part plan view showing one of the mulchers attached to and operated from a spreader of more or less conventional design.

Fig. 2 is a broken vertical sectional view of the same.

Fig. 3 is a broken rear view of the mulcher operating in a lister furrow.

Fig. 4 is a broken part sectional detail of the adjustable cover disc construction.

In the illustration, a more or less conventional form of manure or straw spreader is indicated at 5, having the rearwardly travelling slat conveyor 6. Such a spreader may be used with slight changes, involving removal of the upper and lower cylinders and the distributor which are usually journalled in bearings such as indicated at 7, 8, 9, Fig. 2, and by the insertion of a special end gate 10, mounted with clearance for the spreader conveyor 6. This end gate is shown as having a discharge opening 11 governed by a vertically adjustable sliding door 12, and as carrying at the top a forwardly angled deflector 13, for limiting the building up of the mulch against the forward side of the end gate.

The mulcher is shown as consisting of a frame 14, carrying a conveyor floor 15, over which operates a conveyor chain 16, carrying drag links 17. This conveyor is shown as carried by sprockets 18, 19, on shafts 20, 21, at the opposite ends of the frame and the upper shaft 20, is shown in Fig. 1 as extended and carrying a sprocket 22, over which a sprocket chain 23, is run to the sprocket 24, which is present at the side of the spreader and used ordinarily for driving the distributor journalled in bearings 9.

Attachment of the mulcher to the spreader is accomplished in the illustration by brackets 25, extended forwardly from the sides of the mulcher frame and bolted or otherwise suitably secured to the sides of the spreader at 26, to permit the mulcher to follow the contour of the ground. These attaching brackets may have pivotal connection with the end of the mulcher frame as by bearing bushings 27, concentric with the forward sprocket shaft 20.

The rearward or trailing end of the mulcher is supported by dished cover wheels or discs 28, on shafts 29, journalled in boxes 30, adjustable at 31, in the rearward extensions 32, of the mulcher frame to fix the degree or extent of gather. The disc shafts are shown as coupled by a universal joint 33, permitting different angular settings of the discs.

A hood 34 is shown extending from the end gate opening rearwardly to the mulcher conveyor and the latter is shown as covered by a casing 35, extending from beneath said hood and terminating in a downwardly deflected lower end 36, for depositing the mulch immediately in front of the cover wheels.

The space between the rear end of the spreader conveyor and the upper end of the mulcher conveyor is shown bridged in a general way by plates 37, extending forwardly from the mulcher frame at the sides of the sprocket 18. The mulcher conveyor is shown as kept under proper tension by a spring operated tensioning sprocket 38, Fig. 2.

One or a number of the mulcher units may be applied to a spreader, each in line with a feed opening 11, in the end gate. Where there is more than one mulcher to a spreader, a separate feed regulating gate 12 may be provided for each mulcher.

The mulchers are readily attachable to the spreader and driven from the distributor drive sprocket 24 on the spreader. The removal of the distributor and spreader cylinders provides room for attachment of the mulcher and the mounting of the special end gate. The latter is made high enough to prevent mulch from working back over the top of the same, the deflector 13, aiding this purpose. Various links in the chain of the spreader conveyor may be removed and replaced with drag or attachment links to obtain the desired feed of mulch back to the end gate door, this to some extent depending upon the character of the mulch. The machine will operate with any kind of mulch or soil building materials, such as thrashed straw, bean straw, leaves, corn fodder that has been shredded or thrashed, hay of any character, such as clover, alfalfa or wild hay, or any material that may be gathered with an ordinary hay rake. By running the machine as indicated in Fig. 3, the mulch is deposited directly in the furrow and covered to an extent, depending upon the gather of the discs, by material taken from the ridges at the sides of the furrow. The material is thus placed well below the surface of the ground and can be deeply covered by the use of a lister cultivator, leaving the surface of the ground level and clean. After listing and mulching a field, the lister ridges may be re-listed, thus covering the mulch and filling the lister furrow on either side of the lister ridges. Then by use of the lister cultivator, the furrows left by the second listing may be levelled, leaving the ground well cultivated and ready for any kind of surface planting, such as wheat, oats or any small grain or check-rowed corn, or the like.

Ground tilled in this manner will not blow as readily and where sloping ground is listed on a contour, it will not be as likely to wash as it will hold the run off rains far better than flat plowed ground.

Mulch buried in the damp soil in the manner described, decays rapidly and does not interfere with cultivation from year to year.

For listing any row crop, seed is fed through the regular planter of any lister and is immediately covered by mulch as above described, the desired amount of mulch being regulated by adjustment of the slide at the end gate opening. By use of the invention, the soil may be built up while the crops are growing. The ground is kept mellow and crusting and cracking of the soil is prevented. The invention has many uses. Thus the soil may be inoculated for alfalfa by burying alfalfa straw in lister furrows. Contour forming and pasture lister may be accomplished on sloping pasture land. The mulch in the lister furrows holds moisture and turns to humus, increasing the yield of crops and grasses. As lister ridges are worked into furrows, the mulch is buried below surface of the ground promoting immediate fertility and keeping the soil in condition to absorb moisture and to resist erosion.

What is claimed is:

1. A row crop mulcher, comprising in combination with a vehicle in the nature of a spreader having a rearwardly travelling conveyor and provided with an operating sprocket, an end gate over said conveyor, said end gate having a discharge opening therein, an adjustable door for regulating discharge through said opening, a hood extending rearwardly from said end gate, a conveyor frame having a pivotal connection with said vehicle, cover discs for travelling in a lister furrow and adjustably mounted at the end of said conveyor frame, a rearwardly operating mulch conveyor carried by said frame and driven from said sprocket and a cover over said mulch conveyor extending from a position beneath said hood downwardly to deposit mulch from said spreader's conveyor in the bottom of a furrow in advance of said cover discs.

2. In combination, a mulch carrying vehicle provided with an end gate, having a regulatable discharge opening and provided further with a conveyor for carrying mulch through said discharge opening, a hood extending rearwardly from said discharge opening, a frame pivotally connected with said vehicle, a mulch conveyor on said frame and extending from a position adjacent the rearward end of the first conveyor, a cover over said mulch conveyor extending from beneath said hood and terminating in a downwardly directed mulch depositing portion and cover wheels adjustable for gather at the rearward end of said frame to follow the mulch depositing portion of said cover in the bottom of a lister furrow.

3. In combination, a mulch carrying vehicle provided with an end gate, having a discharge opening and provided with conveying means for carrying mulch from the vehicle through said discharge opening, a hood extending rearwardly from said discharge opening, a frame pivotally connected with said vehicle, a mulch conveyor on said frame and extending from a position adjacent said first conveying means, a cover over said mulch conveyor extending from beneath said hood and terminating in a downwardly directed mulch depositing portion and mulch covering means at the rearward end of said frame positioned to follow said mulch depositing portion of said cover in the bottom of a lister furrow.

GAIL CHALLIS.